United States Patent
Veilleux, Jr. et al.

(10) Patent No.: US 11,459,095 B2
(45) Date of Patent: Oct. 4, 2022

(54) HYDRAULIC BRAKE SYSTEM

(71) Applicant: GOODRICH CORPORATION, Charlotte, NC (US)

(72) Inventors: Leo J. Veilleux, Jr., Wethersfield, CT (US); Lubomir A. Ribarov, West Hartford, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 163 days.

(21) Appl. No.: 16/774,311

(22) Filed: Jan. 28, 2020

(65) Prior Publication Data

US 2021/0229799 A1    Jul. 29, 2021

(51) Int. Cl.

| | |
|---|---|
| *B60T 1/06* | (2006.01) |
| *B60T 1/087* | (2006.01) |
| *B60T 10/02* | (2006.01) |
| *B64C 25/44* | (2006.01) |
| *B60T 7/12* | (2006.01) |
| *B60T 8/34* | (2006.01) |
| *B64C 25/02* | (2006.01) |
| *F16D 55/40* | (2006.01) |
| *F16D 57/02* | (2006.01) |
| *F16D 63/00* | (2006.01) |

(Continued)

(52) U.S. Cl.
CPC ............. *B64C 25/44* (2013.01); *B60T 1/065* (2013.01); *B60T 1/087* (2013.01); *B60T 7/12* (2013.01); *B60T 8/34* (2013.01); *B60T 10/02* (2013.01); *B64C 25/02* (2013.01); *F16D 55/40* (2013.01); *F16D 57/02* (2013.01); *F16D 63/00* (2013.01); *B60T 2240/00* (2013.01); *F16D 2121/04* (2013.01); *F16D 2123/00* (2013.01)

(58) Field of Classification Search
CPC .......... B60T 1/065; B60T 1/087; B60T 1/093; B60T 10/02; B60T 10/04; B64C 25/42; B64C 25/44; F16D 2123/00
USPC .................. 188/155, 292, 293, 296; 303/126
See application file for complete search history.

(56) References Cited

U.S. PATENT DOCUMENTS 2,517,531 A * 8/1950 Rexford .................. F16D 57/04
                                                                188/271
2,543,929 A    3/1951 Olman
(Continued)

FOREIGN PATENT DOCUMENTS

DE          3621290        1/1988
WO      WO-02092406 A1 * 11/2002  .............. B60T 1/087

OTHER PUBLICATIONS

FSF ALAR Briefing Note. 8.4—Braking Devices, pp. 173-177, Flight Safety Foundation, Flight Safety Digest, Aug.-Nov. 2000. https://flightsafety.org/files/alar_bn8-4-braking.pdf.

(Continued)

*Primary Examiner* — Thomas J Williams
(74) *Attorney, Agent, or Firm* — Snell & Wilmer L.L.P.

(57) ABSTRACT

A brake system may comprise a hydraulic brake system or a hybrid brake system. The hydraulic brake system may include an inner axle disposed in an inner axle housing. The inner axle housing may include a working fluid therein. The inner axle may comprise a plurality of paddles extending radially from the inner axle. The working fluid may be pressurized and/or create friction with the plurality of paddles. The pressurized working fluid may impede a free rotation of the plurality of paddles.

17 Claims, 5 Drawing Sheets

(51) Int. Cl.
    *F16D 121/04*     (2012.01)
    *F16D 123/00*     (2012.01)

(56)     References Cited

U.S. PATENT DOCUMENTS

| | | | |
|---|---|---|---|
| 2,750,009 A * | 6/1956 | Pohl | F16D 57/04 |
| | | | 188/296 |
| 2,981,380 A * | 4/1961 | Lessly | F16D 57/04 |
| | | | 188/271 |
| 3,176,938 A | 4/1965 | Hayden | |
| 3,958,671 A | 5/1976 | Muller | |
| 4,367,806 A | 1/1983 | Ramquist | |
| 4,768,401 A * | 9/1988 | Fuehrer | B60T 1/087 |
| | | | 192/216 |
| 5,482,148 A | 1/1996 | Dadel | |
| 7,909,147 B1 * | 3/2011 | Schnell | F16D 65/853 |
| | | | 188/264 D |
| 8,910,758 B2 * | 12/2014 | Jensen | B60T 1/062 |
| | | | 188/296 |
| 2011/0067742 A1 | 3/2011 | Bell et al. | |
| 2015/0159722 A1 * | 6/2015 | Stebbins | F16F 9/145 |
| | | | 188/296 |
| 2017/0227079 A1 | 8/2017 | Grazebrook et al. | |
| 2018/0216684 A1 | 8/2018 | Gruss et al. | |
| 2019/0261458 A1 | 8/2019 | Power et al. | |
| 2019/0291853 A1 | 9/2019 | Bolton et al. | |

OTHER PUBLICATIONS

European Patent Office, European Search Report dated Jul. 6, 2021 in Application No. 21153837.6.

* cited by examiner

SECT B-B

HYDRAULIC BRAKE SYSTEM

FIELD

The present disclosure is directed to aircraft brake systems and, more particularly, to hydraulic brake systems and hybrid hydraulic brake system for use in aircraft landing gear.

BACKGROUND

Some aircraft include one or more landing gear having brake systems disposed therein. Aircraft multi-disk brake systems typically employ a series of friction disks (rotors and stators) forced into contact with each other to stop the aircraft. The braking system can generate relatively large amounts of heat due to the relatively large mass of the aircraft and due to the relatively high velocity of the aircraft upon landing. The friction disks may experience wear during braking events.

SUMMARY

A hydraulic brake system is disclosed herein. The hydraulic brake system may comprise: an inner axle housing; and an inner axle disposed in the inner axle housing, the inner axle comprising a plurality of paddles extending radially outward from the inner axle.

In various embodiments, the hydraulic brake system may further comprise a throttling valve fluidly coupled to the inner axle housing, the throttling valve configured to modulate a pressure in the inner axle housing. The hydraulic brake system may further comprise a heat exchanger fluidly coupled to the inner axle housing. The hydraulic brake system may further comprise an outer axle coupled to the inner axle, the outer axle disposed external to the inner axle housing, the outer axle coupled to a wheel. The hydraulic brake system may further comprise a frame, wherein the inner axle housing is disposed within the frame. The frame may define a first cavity, wherein the inner axle housing defines a second cavity, wherein the first cavity is configured to receive a working fluid and fluidly isolate the working fluid from the first cavity, and wherein the second cavity is configured to be pressurized and impede a free rotation of the inner axle. The hydraulic brake system may further comprise a support bearing disposed in an aperture of the inner axle housing. The hydraulic brake system may further comprise an inner axle seal disposed adjacent to the aperture, the inner axle seal configured to fluidly isolate the second cavity from the first cavity.

A hybrid brake system is disclosed herein. The hybrid brake system may comprise: a frame; a multi-disk brake assembly disposed within the frame; and a hydraulic brake system disposed within the frame, the hydraulic brake system comprising: an inner axle housing; and an inner axle disposed in the inner axle housing, the inner axle comprising a plurality of paddles extending radially outward from the inner axle.

In various embodiments, the hybrid brake system may further comprise a wheel, wherein the multi-disk brake assembly comprises an outer axle coupled to the inner axle and the wheel. The multi-disk brake assembly may further comprise a plurality of rotors and a plurality of stators interleaved between the plurality of rotors. The multi-disk brake assembly may further comprise a plurality of pistons coupled to the frame, the plurality of pistons configured to compress the plurality of rotors and the plurality of stators. The hybrid brake system may further comprise a first wheel, a second wheel, a first outer axle, and a second outer axle, the first outer axle coupled to the first wheel and the inner axle, the second outer axle coupled to the second wheel and the inner axle. The multi-disk brake assembly may further comprise a first plurality of rotors extending radially outward from the first outer axle, wherein the multi-disk brake assembly further comprises a first plurality of stators interleaved between the first plurality of rotors. The multi-disk brake assembly may further comprise a second plurality of rotors extending radially outward from the second outer axle, wherein the multi-disk brake assembly further comprises a second plurality of stators interleaved between the second plurality of rotors. The hybrid brake system may further comprise a landing gear strut and a heat exchanger, the landing gear strut coupled to the frame, the heat exchanger disposed in the strut and fluidly coupled to the inner axle housing.

A method of using a braking system is disclosed herein. The method may comprise: applying a modulated hydraulic pressure to a hydraulic fluid surrounding an inner axle, the inner axle disposed in an inner axle housing of a main landing gear assembly; inducing a pressure differential between a tank and a cavity of the inner axle housing in response to applying the modulated hydraulic pressure; and impeding a free rotation of a plurality of paddles extending radially outward from the inner axle in response to the pressure differential.

The method may further comprise measuring a wheel speed and varying the modulated hydraulic pressure in response to the wheel speed. The method may further comprise circulating the hydraulic fluid through a heat exchanger. The pressure differential may create a friction between the plurality of paddles and the hydraulic fluid.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
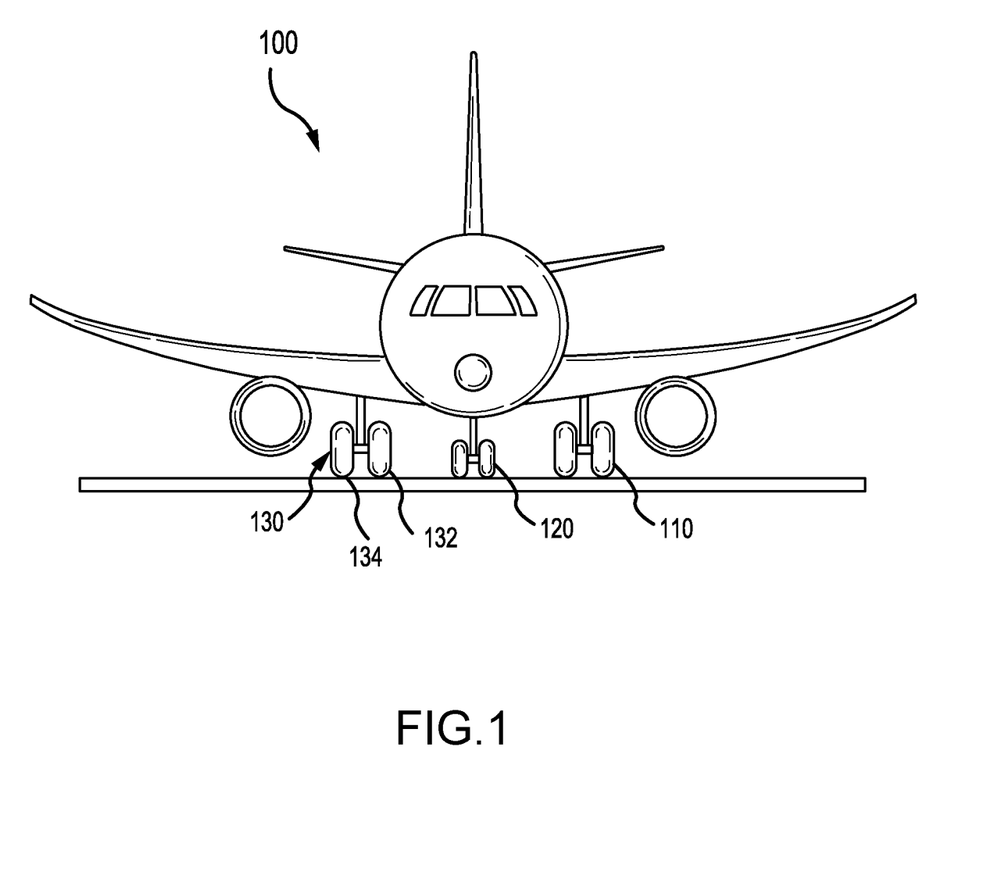
FIG. 1 is a drawing of an aircraft having landing gear, in accordance with various embodiments.

Referring now to FIG. 1, an aircraft 100 in accordance with various embodiments can include multiple landing gear including main landing gear 110, nose landing gear 120 and main landing gear 130. Each landing gear may include one or more wheel assemblies. For example, the landing gear 130 includes an inner wheel assembly 132 and an outer wheel assembly 134. The inner wheel assembly 132 and the outer wheel assembly 134, along with the other wheels of the aircraft 100, can include a braking system that provides a braking force to the corresponding wheel. Each braking system may comprise a hydraulic braking system or a hybrid hydraulic brake system, as disclosed further herein.

Figure 2:
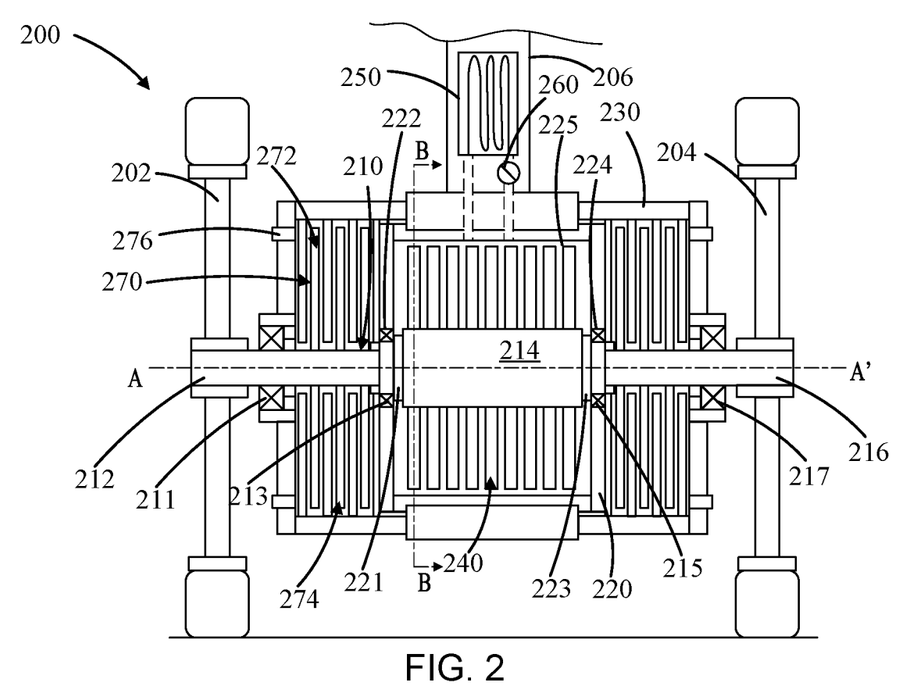
FIG. 2 is a cross-sectional view of a brake system, in accordance with various embodiments.

Referring now to FIG. 2, a cross-sectional view of a brake system 200, in accordance with various embodiments, is illustrated. In various embodiments, the brake system 200 may comprise a hybrid braking system (i.e., a mechanical brake system and a hydraulic brake system), a hydraulic brake system only, or the like. The brake system 200 comprises a first wheel 202 and an axle assembly 210. The first wheel is coupled to the axle assembly 210 and configured to rotate about a centerline A-A' of axle assembly 210. The brake system 200 may further comprise a second wheel 204 disposed opposite the first wheel 202. The second wheel 204 may be coupled to the first wheel 202 via the axle assembly 210. In various embodiments, first wheel 202 and second wheel 204 may be configured for differential braking, or the like. Although illustrated as having a first wheel 202, and a second wheel 204, any number of wheels for landing gear is within the scope of this disclosure.

In various embodiments, the axle assembly 210 comprises a first outer axle 212 and an inner axle 214. The first outer axle 212 may be disposed between inner axle 214 and first wheel 202. The axle assembly 210 may further comprise a second outer axle 216. The second outer axle 216 may be disposed between inner axle 214 and the second wheel 204. The inner axle 214 may be supported by a first support bearing 213 disposed at a first end of inner axle 214 proximate the first outer axle 212 and a second support bearing 215 disposed at a second end of inner axle 214 proximate the second outer axle 216. The first outer axle 212 may be supported by a first impact bearing 211 and the second outer axle 216 may be supported by a second impact bearing 217.

In various embodiments, the brake system 200 further comprises an inner axle housing 220 and a frame 230. The inner axle housing 220 may fully enclose the inner axle 214. The inner axle housing 220 may be coupled to the frame 230 and/or supported structurally by the frame 230. In various embodiments, frame 230 is coupled to a landing gear strut 206. Landing gear strut 206 may be a part of a main landing gear strut, such as main landing gear 110 and/or main landing gear 130 from FIG. 1.

In various embodiments, the inner axle housing 220 may comprises a first aperture 222 disposed proximate the first wheel 202 and a second aperture 224 disposed proximate the second wheel 204. The axle assembly 210 may extend from the first wheel 202 through the first aperture 222 and the second aperture 224 to the second wheel 204. The first support bearing 213 may be disposed in the first aperture 222. The second support bearing 215 may be disposed in the second aperture 224. The inner axle housing 220 may further comprise a first axle seal 221 disposed adjacent to the first aperture 222 and a second axle seal 223 disposed adjacent to the second aperture. The first axle seal 221 and the second axle seal 223 may be configured to fluidly isolate an internal cavity of the inner axle housing 220 from an internal cavity of the frame 230.

In various embodiments, a working fluid 225 is disposed within the inner axle housing 220. The working fluid may be any fluid known in the art, such as a non-corrosive/lubricating and/or non-compressible fluid (e.g., hydraulic fluid, engine oil, machine oil, gear oil, or the like).

In various embodiments, the inner axle 214 comprises a plurality of paddles 240 disposed axially along the inner axle 214 and extending radially outward from the inner axle 214. During operation, the plurality of paddles 240 rotate with the axle assembly 210 and the wheels 202, 204. The working fluid 225 may be configured to provide hydraulic friction to the plurality of paddles 240 and/or slow down the plurality of paddles and the wheels 202, 204. In various embodiments, a portion of the working fluid 225 may be disposed in the inner axle housing 220 and a portion of the working fluid may be disposed in a tank external to the inner axle housing 220. A pressure differential between the tank and the inner axle housing 220 may occur during operation of the brake system 200.

In various embodiments, the brake system 200 may further comprise a heat exchanger 250 and a throttling valve 260. The heat exchanger 250 may be disposed in a strut of a main landing gear assembly (e.g., landing gear strut 206). The heat exchanger 250 may be in fluid communication with the internal cavity of the inner axle housing 220 through the frame 230. The throttling valve 260 may be configured to modulate a throttling pressure to the working fluid 225, the throttling pressure may increase during use and the increased pressure may impede the free rotation of the plurality of paddles 240. In this regard, a braking motion of the wheels 202, 204 occurs from the increased pressure. In various embodiments, the heat exchanger 250 may comprise an air-oil cooler, cross-flow heat exchanger, or the like.

The brake system 200 may further comprise a multi-disk braking assembly 270. The multi-disk braking assembly 270 may comprise a plurality of rotors 272, a plurality of stators 274, and a plurality of pistons 276. The plurality of rotors 272 may be interleaved with the plurality of stators 274 within frame 230. The plurality of rotors 272 may extend radially outwards from the first outer axle 212 and/or the second outer axle 216. The plurality of stators 274 may extend radially inward from the frame 230. The plurality of pistons may be disposed proximate first wheel 202 and/or proximate second wheel 204. The plurality of pistons 276 may be configured to extend axially inward toward the plurality of rotors 272 and the plurality of stators 274. In this regard, the plurality of rotors 272 may contact the plurality of stators 274 and/or provide redundant braking. The multi-disk braking assembly 270 may be utilized to achieve a heavier braking force, or when any other braking device, such as a aerodynamic spoiler or thrust reverser is malfunctioning. Although the brake system 200 is illustrated with redundant braking, a hydraulic braking system without the multi-disk braking assembly 270 is within the scope of this disclosure.

Figure 3:
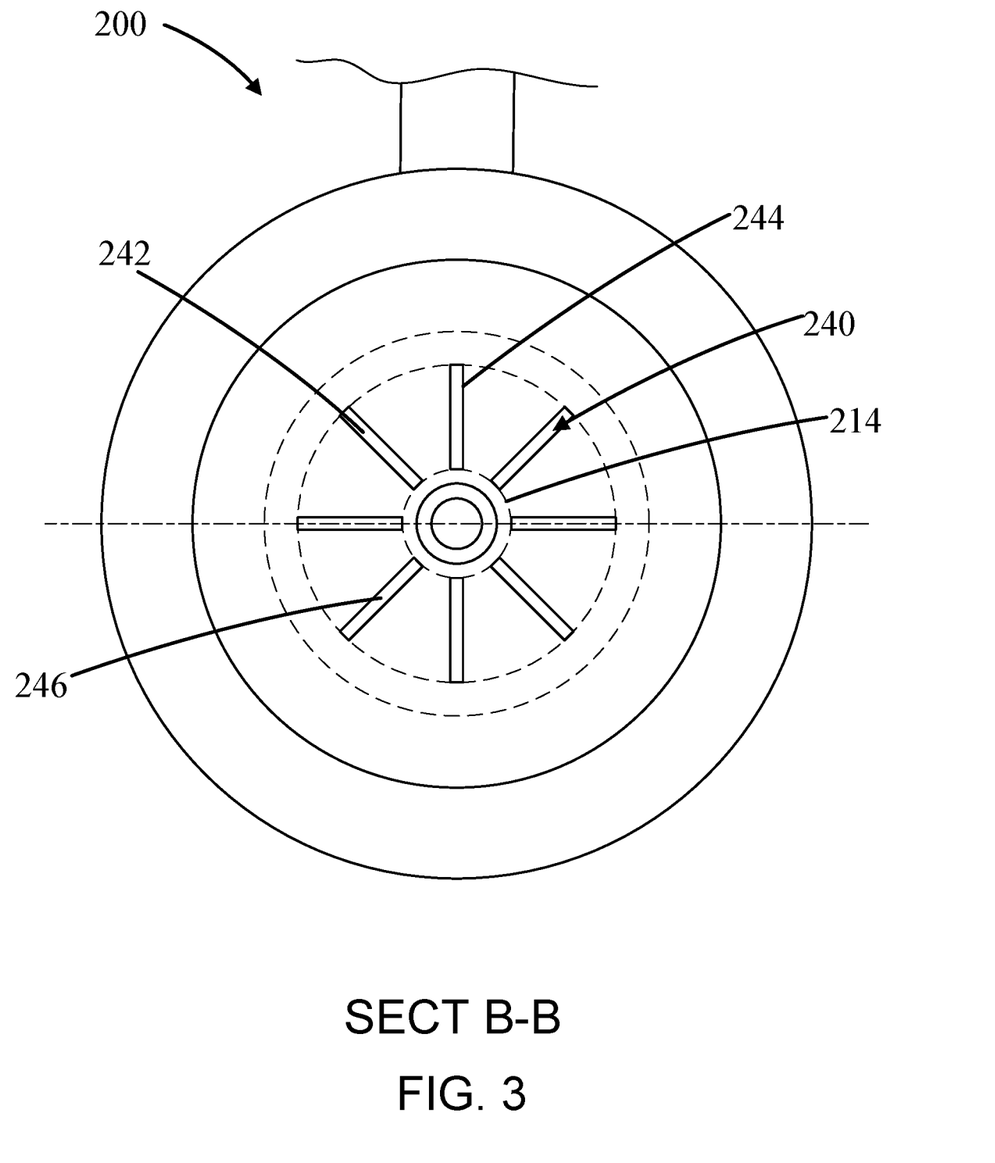
FIG. 3 is a cross-sectional view of the brake system of FIG. 2 along a section line B-B, in accordance with various embodiments.

Referring now to FIG. 3, a cross-sectional view of the brake system 200 along section line B-B from FIG. 2, in accordance with various embodiments, is illustrated. In various embodiments, the plurality of paddles 240 may be disposed circumferentially about inner axle 214. For example, a first paddle 242 in the plurality of paddles 240 may be disposed circumferentially adjacent to a second paddle 244 and a third paddle 246. In various embodiments, there may be any number of paddles in the plurality of paddles 240 disposed circumferentially at a given axial location. For example, there may be between 2 and 12 paddles at a given axial location, or between 3 and 10 paddles, or about 6 paddles.

Figure 4:
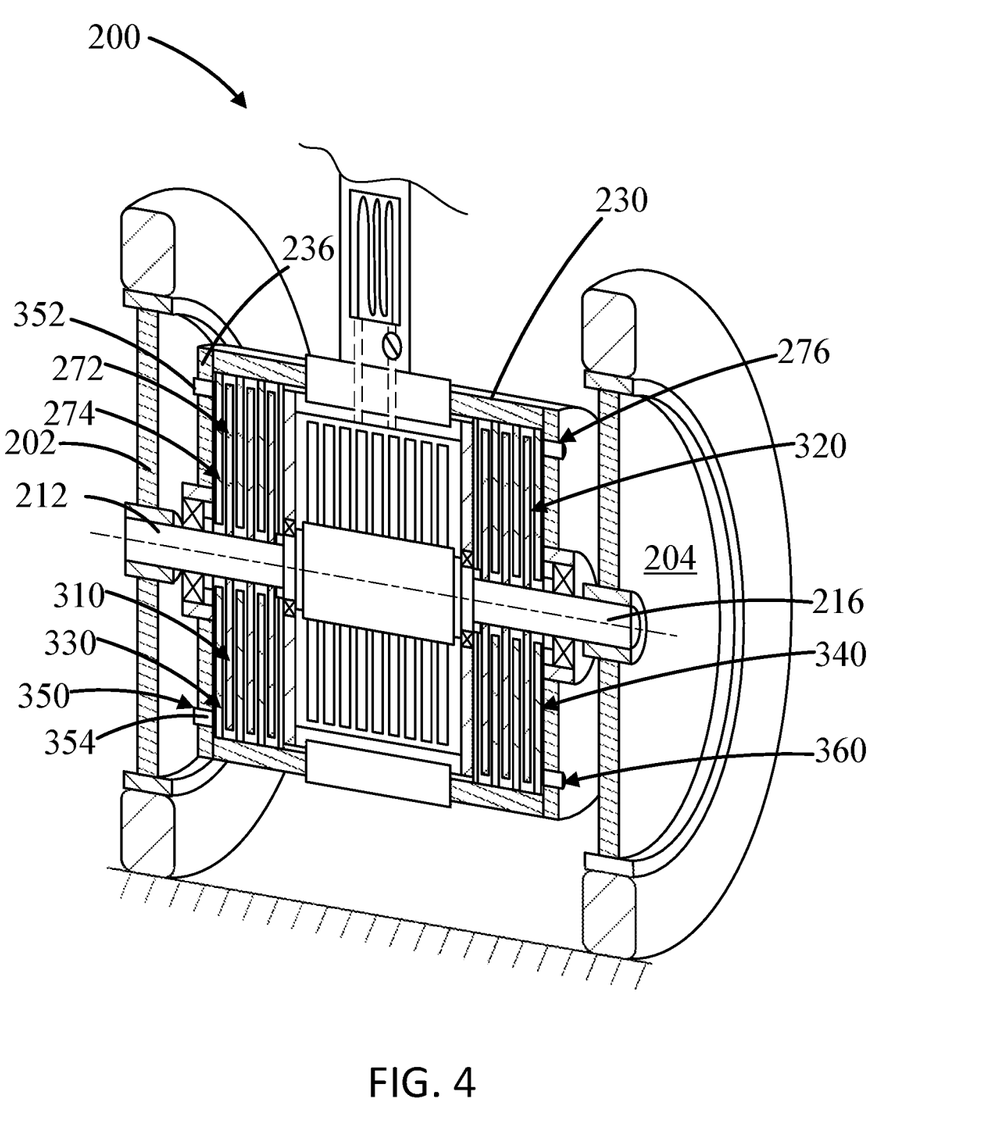
FIG. 4 is a perspective cross-sectional view of the brake system of FIG. 2, in accordance with various embodiments.

Referring now to FIG. 4, a perspective cross-sectional view of a brake system 200, in accordance with various embodiments, is illustrated. In various embodiments, the frame 230 may be annular in shape. Although illustrated as annular in shape, the frame 230 may be any shape known in the art.

In various embodiments, the plurality of rotors 272 may comprise a first plurality of rotors 310 and a second plurality of rotors 320. The first plurality of rotors 310 may extend radially outward from the first outer axle 212. The second plurality of rotors 320 may extend radially outward from the second outer axle 216.

In various embodiments, the plurality of stators 274 may comprise a first plurality of stators 330 and a second plurality of stators 340. The first plurality of stators 330 may be interleaved between the first plurality of rotors 310. The second plurality of stators 340 may be interleaved between the second plurality of rotors 320.

In various embodiments, the plurality of pistons 276 may comprise a first plurality pistons 350 and a second plurality of pistons 360. The first plurality of pistons 350 may be moveably coupled to a first end of the frame 230. The first end of the frame 230 may be proximate the first wheel 202. The first plurality of pistons 350 may be disposed circumferentially about an axial wall 236 of the frame 230. For example, a first piston 352 in the first plurality of pistons 350 and a second piston 354 in the plurality of pistons 350 may be disposed approximately 180 degrees apart. In various embodiments, there may be any number of pistons in the first plurality of pistons 350. The second plurality of pistons 360 may be in accordance with the first plurality of pistons 350 but disposed proximate the second wheel 204 on a second end of the frame 230.

Figure 5:
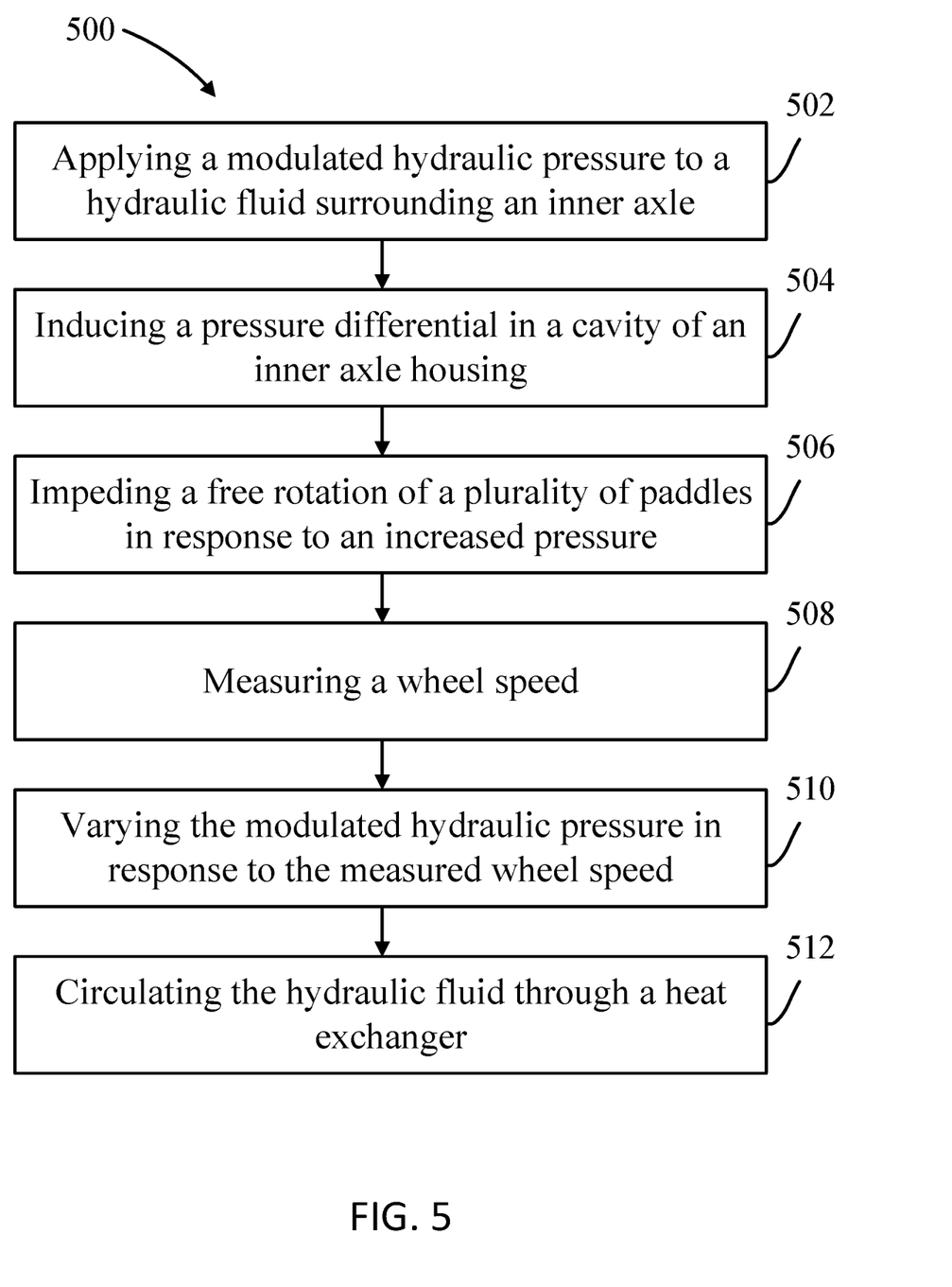
FIG. 5 is a method of using a brake system, in accordance with various embodiments.

Referring now to FIG. 5, a method 500 of using a braking system, in accordance with various embodiments, is illustrated. With combined reference to FIGS. 2 and 5, the method 500 may comprise applying a modulated hydraulic pressure to a hydraulic fluid surrounding an inner axle (step 502). The modulated hydraulic pressure may be applied by a throttling valve 260, or the like. The hydraulic fluid may be disposed in an inner axle housing 220 of a main landing gear assembly. The inner axle may be in accordance with inner axle 214 and comprise a plurality of paddles 240 disposed axially along the inner axle 214 and extending radially outward from the inner axle 214.

The method 500 may further comprise inducing a pressure differential in a cavity of the inner axle housing (step 504). The pressure differential may be between a tank and the inner axle housing (e.g., inner axle housing 220). The method 500 may further comprise impeding a free rotation of a plurality of paddles in response to an increased pressure from the pressure differential (step 506). The plurality of paddles may be in accordance with the plurality of paddles 240 and extend radially outward from the inner axle 214 and be disposed axially along the inner axle 214 and circumferentially about inner axle 214. Due to an increased friction between the plurality of paddles and the hydraulic fluid, a braking motion may be experienced by the wheels (e.g., wheels 202, 204).

The method 500 may further comprise measuring a wheel speed (step 508). A wheel speed may be measured by a speed sensor disposed in the main landing gear, or the like. The wheel speed may be communicated to an electronic control unit (ECU), or the like. The method 500 may further comprise varying the modulated hydraulic pressure in response to the measured wheel speed (step 510). By varying the modulated hydraulic pressure, the system may prevent any wheel lock-up, or the like.

The method 500 may further comprise circulating the hydraulic fluid through a heat exchanger (step 512). The heat exchanger may be in accordance with heat exchanger 250. The hydraulic fluid may be kept below a flash point by circulating the hydraulic fluid through the heat exchanger. In this regard, the heat exchanger may maintain a temperature of the hydraulic fluid that is less than a flash point of the hydraulic fluid during operation of the braking system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hydraulic brake system, comprising:
    a throttling valve;
    a frame;
    an inner axle housing disposed within the frame, the inner axle housing defining a first cavity, the throttling valve fluidly coupled to the first cavity of the inner axle housing;
    an inner axle disposed in the inner axle housing, the inner axle comprising a plurality of paddles extending radially outward from the inner axle, wherein:
        the first cavity is configured to be pressurized via the throttling valve and impede a free rotation of the inner axle,
        the plurality of paddles include a first set of paddles spaced apart circumferentially about the inner axle, a second set of paddles spaced apart circumferentially about the inner axle, and a third set of paddles spaced apart circumferentially about the inner axle,
        the first set of paddles spaced apart axially from the third set of paddles,
        the second set of paddles spaced apart axially, and disposed axially between, the first set of paddles and the third set of paddles,
        the frame defines a second cavity, and
        the first cavity is configured to receive a working fluid and fluidly isolate the working fluid from the second cavity.

2. The hydraulic brake system of claim 1, wherein the throttling valve configured to modulate a pressure in the inner axle housing.

3. The hydraulic brake system of claim 2, further comprising a heat exchanger fluidly coupled to the inner axle housing.

4. The hydraulic brake system of claim 1, further comprising an outer axle coupled to the inner axle, the outer axle disposed external to the inner axle housing, the outer axle coupled to a wheel.

5. The hydraulic brake system of claim 1, further comprising a support bearing disposed in an aperture of the inner axle housing.

6. The hydraulic brake system of claim 5, further comprising an inner axle seal disposed adjacent to the aperture, the inner axle seal configured to fluidly isolate the second cavity from the first cavity.

7. A hybrid brake system, comprising:
    a frame configured to be disposed axially between a first wheel and a second wheel;
    a multi-disk brake assembly disposed within the frame, the multi-disk brake assembly comprising a plurality of rotors coupled and a plurality of stators interleaved between the plurality of rotors; and
    a hydraulic brake system disposed within the frame, the hydraulic brake system comprising:
        an inner axle housing defining a cavity, the inner axle housing disposed within the frame; and
        an inner axle disposed in the inner axle housing, the inner axle coupled to an outer axle, the inner axle comprising a plurality of paddles extending radially outward from the inner axle, the plurality of paddles comprising a first set of paddles spaced apart circumferentially about the inner axle and a second set of paddles spaced apart circumferentially about the inner axle, the first set of paddles spaced apart axially from the second set of paddles.

8. The hybrid brake system of claim 7, further comprising the first wheel and the second wheel, wherein the multi-disk brake assembly comprises the outer axle coupled to the inner axle and the first wheel.

9. The hybrid brake system of claim 7, wherein the multi-disk brake assembly further comprises a plurality of pistons coupled to the frame, the plurality of pistons configured to compress the plurality of rotors and the plurality of stators.

10. The hybrid brake system of claim 7, further comprising the first wheel, the second wheel, a first outer axle, and a second outer axle, the first outer axle coupled to the first wheel and the inner axle, the second outer axle coupled to the second wheel and the inner axle.

11. The hybrid brake system of claim 10, wherein the multi-disk brake assembly further comprises a first plurality of rotors extending radially outward from the first outer axle, wherein the multi-disk brake assembly further comprises a first plurality of stators interleaved between the first plurality of rotors.

12. The hybrid brake system of claim 11, wherein the multi-disk brake assembly further comprises a second plurality of rotors extending radially outward from the second outer axle, wherein the multi-disk brake assembly further comprises a second plurality of stators interleaved between the second plurality of rotors.

13. The hybrid brake system of claim 7, further comprising a landing gear strut, a throttling valve, and a heat exchanger, the landing gear strut coupled to the frame, the heat exchanger and the throttling valve disposed in the landing gear strut and fluidly coupled to the inner axle housing, the throttling valve configured to pressurize the cavity and impede a free rotation of the inner axle.

14. A method of using a braking system, the method comprising:
    applying a modulated hydraulic pressure to a hydraulic fluid surrounding an inner axle, the inner axle disposed in an inner axle housing of a main landing gear assembly, the inner axle housing disposed within a frame of the main landing gear assembly, the frame disposed between a first wheel and a second wheel;
    inducing a pressure differential between a tank and a cavity of the inner axle housing in response to applying the modulated hydraulic pressure; and
    impeding a free rotation of a plurality of paddles extending radially outward from the inner axle in response to the pressure differential, the plurality of paddles including a first set of paddles spaced apart circumferentially about the inner axle, a second set of paddles spaced apart circumferentially about the inner axle, and a third set of paddles spaced apart circumferentially about the inner axle, the first set of paddles spaced apart axially from the third set of paddles, the second set of paddles spaced apart axially from, and disposed between, the first set of paddles and the second set of paddles.

15. The method of claim 14, further comprising measuring a wheel speed and varying the modulated hydraulic pressure in response to the wheel speed.

16. The method of claim 14, further comprising circulating the hydraulic fluid through a heat exchanger.

17. The method of claim 14, wherein the pressure differential creates a friction between the plurality of paddles and the hydraulic fluid.

* * * * *